(12) United States Patent
Igushi et al.

(10) Patent No.: US 6,878,442 B1
(45) Date of Patent: Apr. 12, 2005

(54) POLYESTER FILM FOR METAL PLATE LAMINATE, FILM-LAMINATED METAL PLATE AND METAL CONTAINER

(75) Inventors: Hideki Igushi, Inuyama (JP); Hideki Shimizu, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/704,792

(22) Filed: Nov. 3, 2000

(30) Foreign Application Priority Data

Nov. 5, 1999  (JP) ............................................ 11/316132

(51) Int. Cl.⁷ ................................................. B32B 1/02
(52) U.S. Cl. ..................... 428/357; 428/36.7; 428/36.8; 428/480
(58) Field of Search ............................... 428/36.7, 36.8, 428/480, 35.7

(56) References Cited

U.S. PATENT DOCUMENTS 5,230,935 A * 7/1993 Delimoy et al. ........... 428/36.7
5,776,616 A * 7/1998 Kosuga et al. .............. 428/480
5,922,424 A * 7/1999 Igushi et al. ................ 428/35.9

FOREIGN PATENT DOCUMENTS

EP    0 638 412 A1    2/1995

* cited by examiner

*Primary Examiner*—Harold Pyon
*Assistant Examiner*—Marc Patterson
(74) *Attorney, Agent, or Firm*—Morrison & Foerster LLP

(57) ABSTRACT

A polyester film which shows, upon preparation of a film-laminated metal plate by laminating the film of one side of the metal plate made of a tin free steel, a coefficient of kinetic friction at 80 degrees Celsius at the surface thereof of not more than 0.45 and an ethylene terephthalate cyclic trimer content of not more than 0.7 wt %, and a dimensional change of not more than 2.0% after a heat treatment at 210 degrees Celsius for 2 minutes of the film laminated metal plate. This polyester film is superior in heat resistance, barrier property and corrosion resistance, and is preferably used as a material forming a metal container for food.

9 Claims, No Drawings

POLYESTER FILM FOR METAL PLATE LAMINATE, FILM-LAMINATED METAL PLATE AND METAL CONTAINER

TECHNICAL FIELD OF THE INVENTION

The present invention relates to a polyester film used for preventing corrosion of metal containers for food, such as soft drinks, beer, canned food etc., and the like, a film-laminated metal plate having the film laminated on the metal plate, and to a metal container obtained by forming the film-laminated metal plate.

BACKGROUND OF THE INVENTION

It is a general and conventional practice to apply a coating on the inside and outside of a metal can to prevent corrosion, wherein the coating is generally made from a thermosetting resin.

For application of a thermosetting resin coating, a solvent type coating is used in most cases. The formation of a coating film requires heating at a high temperature for a long time, for example, 150–250° C. for several minutes. In addition, a large amount of the organic solvent scatters during baking, giving rise to a demand for an improvement including simplification of the process, prevention of pollution and the like.

The film formed under the aforementioned conditions inevitably contains a small amount of the organic solvent. When, for example, food is filled in a metal can having the above-mentioned film inside the can, the organic solvent may be transferred to the food to spoil the taste and flavor of the food. It also happens that the additive in the coating and a low molecular weight substance in the coating, which has been produced by incomplete crosslinking reaction, may be transferred to the food, thereby causing an adverse influence on the food, like the aforementioned residual organic solvent.

A different method for preventing corrosion is the use of a thermoplastic resin film. For example, a polyolefin film such as a polypropylene film and the like or a polyester film is laminated on a heated tin free steel and the resulting film-laminated metal plate is processed to give a metal can.

The use of the thermoplastic resin film resolves the above-mentioned problems of simplification of the process, prevention of pollution and the like.

Of the thermoplastic resin films, for example, when a polyolefin film, such as polyethylene and polypropylene, is used, heat history from a can forming process or heat history from a retorting treatment after can forming and the like may cause peeling off of the film from the film-laminated metal plate, because this film has poor heat resistance.

A method comprising the use of a polyester film as the thermoplastic resin film is most preferable, because the problems associated with the above-mentioned polyolefin film can be resolved.

A polyester film applied to the inside of a can shows superior heat resistance and allows only a small level of a low molecular weight substance to be generated. Consequently, it show less occurrence of spoiled taste and flavor of food due to the transferred low molecular weight substance, as compared to a polyolefin film. In other words, this film is superior in preventing occurrence of spoiled flavor.

However, the use of a polyester film containing polyethylene terephthalate as a main component for this end is not free from a problem. This is because a heat treatment during a can forming process after laminate processing, which aims at superior finish of the can, covering an uncovered joint part with a film band, and the like could cause dimensional changes only in the film part of the film-laminated metal plate due to the insufficient heat resistance of the polyester film, which in turn results in a loose film and a failure to completely cover the surface of a metal plate.

SUMMARY OF THE INVENTION

It is therefore an object of the present invention to provide a polyester film superior in heat resistance, barrier property and corrosion resistance, which is capable of stably covering the surface of a metal plate even after experiencing the heat history during the can forming process and the like, and which is preferably used for producing a metal container for food, a film-laminated metal plate superior in can forming processability, and a metal container superior in corrosion resistance and protection of food in the container.

According to the present invention, there has been provided a polyester film which shows, upon preparation of a film-laminated metal plate by laminating the film on one side of the metal plate made of a tin free steel, a coefficient of kinetic friction at 80° C. at the surface thereof of not more than 0.45 and an ethylene terephthalate cyclic trimer content of not more than 0.70 wt %, and a dimensional change of not more than 2.0% after a heat treatment at 210° C. for 2 minutes of the film-laminated metal plate.

In a preferable embodiment, the above-mentioned film has a two-layer structure of A/B, wherein A is a layer made from a polyester having a melting point of 240–260% and B is a layer made from a polyester having a melting point of 200–235° C., and B is laminated on a metal plate to give a film-laminated metal plate.

In another preferable embodiment, the above-mentioned film is a biaxially oriented film.

In a yet preferable embodiment, the above-mentioned film contains crosslinked polymer particles and/or inorganic fine particles.

The present invention also provides a film-laminated metal plate comprising the above-mentioned polyester film laminated on at least one side of the metal plate.

The present invention further provides a metal container obtained by forming the above-mentioned film-laminated metal plate.

DETAILED DESCRIPTION OF THE INVENTION

The polyester film of the present invention characteristically shows, upon preparation of a film-laminated metal plate by laminating the film on one side of the metal plate made of a tin free steel, a coefficient of kinetic friction at 80° C. at the surface thereof of not more than 0.45 and an ethylene terephthalate cyclic trimer content of not more than 0.70 wt %, and a dimensional change of not more than 2.0% after a heat treatment at 210° C. for 2 minutes of the film-laminated metal plate.

The polyester to be used for the above-mentioned polyester film is obtained by condensation polymerization of polycarboxylic acid and polyhydric alcohol as main components.

Examples of the above-mentioned polycarboxylic acid component include dicarboxylic acid such as aromatic dicarboxylic acid (e.g., terephthalic acid, isophthalic acid, phthalic acid, naphthalenedicarboxylic acid, biphenyldicarboxylic acid and the like), aliphatic dicarboxylic acid (e.g., adipic acid, azelaic acid, sebacic acid, decanedicarboxylic acid, dodecanedicarboxylic acid, dimer acid and the like), alicyclic dicarboxylic acid (e.g., cyclohexanedicarboxylic acid and the like), and the like.

Examples of the polyhydric alcohol component include glycol such as aliphatic diol (e.g., ethylene glycol, diethylene glycol, triethylene glycol, propanediol, butanediol, hexanediol, dodecamethylene glycol, neopentyl glycol and the like), alicyclic diol (e.g., cyclohexane dimethanol and the like), aromatic diol (e.g., ethylene oxide adduct of bisphenol derivative and the like), and the like.

The above-mentioned polyester is preferably obtained by condensation polymerization of a dicarboxylic acid selected from terephthalic acid and isophthalic acid, and a glycol selected from ethylene glycol, diethylene glycol and butanediol. The polyester has a melting point of preferably 200–260° C., more preferably 210–260° C., still more preferably 215–255° C. When the melting point is less than 200° C., the heat history from the can forming process and the like increases flowability, which may cause greater dimensional changes. When it exceeds 260° C., the production cost becomes higher, which is economically disadvantageous.

The above-mentioned polyester has an intrinsic viscosity of preferably 0.5–1.5, more preferably 0.55–1.2, from the aspect of mechanical property.

The polyester film of the present invention as measured according to the measurement method to be mentioned later shows a dimensional change of not more than 2.0%, preferably not more than 1.0%, more preferably not more than 0.8%. The measurement method in brief comprises laminating the film on one side of a metal plate made of a tin free steel to give a film-laminated metal plate, subjecting the film-laminated metal plate to a heat treatment at 210° C. for 2 minutes and measuring the dimensional change of the film. By setting the dimensional change to not more than 2.0%, the polyester film can cover the surface of a metal plate stably even after a heat treatment during a can forming process and the like.

The method for setting the dimensional change of the above-mentioned film to not more than 2.0% is not particularly limited. For example, the dimensional stability can be improved by providing a high degree of crystallization by an increased rate of crystallization upon copolymerization with butanediol as the above-mentioned polyester component; when the polyester film is a biaxially oriented film having a two-layer structure, heat setting is applied at a temperature to be mentioned later to improve dimensional stability; when the polyester film is an oriented film to be mentioned later, a relaxation process is applied after stretching, to improve dimensional stability; and the like.

When a film-laminated metal plate is formed according to the measurement method of the dimensional change to be mentioned later, the above-mentioned film shows a coefficient of kinetic friction at 80° C. at the surface thereof of not more than 0.45, preferably not more than 0.43, more preferably not more than 0.40. When the coefficient of kinetic friction is not more than 0.45, occurrence of flaw on the film and contamination of the can forming process due to film shavings and the like produced during the can forming process and the like can be prevented.

The coefficient of kinetic friction of the above-mentioned film surface is made to fall within the range of not more than 0.45 by, for example, adding crosslinked polymer particles and/or inorganic fine particles to be mentioned later to the film, forming fine spherical crystals of a polyester resin, and the like.

When a film-laminated metal plate is formed according to the measurement method of the dimensional change to be mentioned later, the above-mentioned film has an ethylene terephthalate cyclic trimer content of not more than 0.70 wt %, preferably not more than 0.50 wt %. When the ethylene terephthalate cyclic trimer content is not more than 0.70 wt %, a protective effect of food can be afforded and superior appearance of the can can be retained.

The ethylene terephthalate cyclic trimer content of the above-mentioned film can be set to not more than 0.70 wt % by, for example, producing a polyester having a small cyclic trimer content by heat treatment under reduced pressure, solid phase polymerization and the like, extracting the cyclic trimer with water or organic solvent after polyester production and film forming, or a combination of these methods and the like.

The above-mentioned film may be an unoriented film or an oriented film (uniaxially oriented film or biaxially oriented film), with preference given to a biaxially oriented film. By biaxial orientation of the polyester film, the preventive effect of spoiled flavor that the polyester film has can be highly improved. The method of biaxial orientation is not particularly limited and known biaxial orientation (simultaneous, sequential and the like) can be applied. In this case, the draw ratio in the longitudinal direction is preferably 2–5, more preferably 2.5–4, and the stretching temperature is preferably 80–120° C. more preferably 90–110° C. The draw ratio in the transverse direction is preferably 2–5, more preferably 2.5–4 and the stretching temperature is preferably 80–120° C., more preferably 90–110° C.

The above-mentioned film has a thickness of preferably 4–65 μm, more preferably 5–30 μm. When the thickness is less than 4 μm, the barrier property and corrosion resistance are degraded. When the thickness exceeds 65 μm, it is economically disadvantageous.

The above-mentioned film may have a monolayer or multiplayer structure, with preference given to a two-layer structure of A/B, wherein A is a layer made from a polyester having a melting point of 240–260° C. and B is a layer made from a polyester having a melting point of 200–235° C., preferably 210–235%. This is because layer A requires heat resistance during the can forming process, and layer B requires the same heat resistance as layer A and adhesive property when forming a laminate by heat pressing. When a metal container is prepared using a film-laminated metal plate obtained by laminating the polyester film on a metal plate, layer A comes into contact with the food in the container or becomes the surface of the container, and layer B is laminated on the metal plate side.

The polyester to be used for forming layer A is exemplified by those obtained from the above-mentioned dicarboxylic acid and glycol. Preferred one comprises a terephthalic acid-ethylene glycol component, more preferably a mixture of one containing a terephthalic acid-ethylene glycol component and one containing a terephthalic acid-butanediol component. More preferable one has a weight ratio (one containing a terephthalic acid-ethylene glycol component/ one containing a terephthalic acid-butanediol component) of 98/2–50/50, particularly preferably 95/5–70/30.

The polyester to be used for forming layer A has a melting point of 240–260° C., preferably 245–255° C. When the melting point is less than 240%, the heat resistance during a can forming process and the like becomes insufficient. When the melting point exceeds 260° C., the production becomes costly, which is economically disadvantageous.

The above-mentioned layer A forms a surface layer of a film-laminated metal plate prepared according to the dimensional change measurement method to be mentioned later. Therefore, the film surface on which the above-mentioned coefficient of kinetic friction at 80° C. is measured is the surface of layer A. The coefficient of kinetic friction of the surface of layer A at 80° C. can be set to not more than 0.45 by the above-mentioned method.

The above-mentioned layer A preferably has a smaller ethylene terephthalate cyclic trimer content, so that the protective effect on the food and appearance of the can can be retained. The polyester to be used to form the layer A preferably has a smaller ethylene terephthalate cyclic trimer content. The ethylene terephthalate cyclic trimer content of this polyester is preferably not more than 0.70 wt %, more preferably not more than 0.50 wt %. The polyester having a smaller cyclic trimer content can be produced by preparing such polyester by a heat treatment under reduced pressure, solid phase polymerization and the like, extracting the cyclic trimer with water or organic solvent after polyester production, or a combination of these methods and the like.

The polyester to be used for the above-mentioned layer B has a melting point of 200–235%, preferably 210–235° C., more preferably 215–230° C. When the melting point is less than 200° C., the flowability of layer B increases due to the heat history during the can forming process and the like, and the dimensional changes of layer A may become unfavorably marked. When the melting point exceeds 235° C., it approaches the melting point of layer A, which in turn makes reduction or elimination of the residual shrinkage stress of layer A insufficient, again possibly making the dimensional changes of layer A unpreferably greater. Examples of the polyester include, like layer A, a polyester obtained from the above-mentioned dicarboxylic acid and glycol. Preferred is a polyester that contains copolymerized polyester of terephthalic acid and isophthalic acid as an acid component (preferably, the molar ratio of terephthalic acid/isophthalic acid is 95/5–80/20, particularly preferably 95/5–85/15) and ethylene glycol as a glycol component.

The layer A has a thickness of preferably 3–50 μm, more preferably 4–40 μm, from the aspect of can forming processability, dimensional stability against heat history during can forming process, handling property, barrier property, corrosion resistance, economic aspect of the film, and the like. The thickness of layer B is preferably 1–15 μm, more preferably 1–10 μm, from the aspect of adhesive property, heat resistance against heat history during the can forming process, and the like.

The production method of a polyester film having the above-mentioned A/B two-layer structure is not particularly limited as long as a film satisfying the above-mentioned requirements can be produced. Examples thereof include multi-layer extrusion, extrusion laminating and the like.

When the polyester film having an A/B two-layer structure is a biaxially oriented film, the residual shrinkage stress of layer A due to the biaxial orientation is preferably reduced or eliminated by heat setting and the like. In this way, dimensional changes due to heat history during can forming process and the like can be reduced. The layer B is preferably converted to amorphous or made to be unoriented by heat history and the like, when the above-mentioned layer A is subjected to heat setting and the like to reduce or eliminate the residual shrinkage stress. As a result, when the film is laminated onto a preheated metal plate, sufficient adhesion of the laminate can be achieved even without preheating the metal plate to the melting point of layer B, whereby a low temperature and high speed laminating step can be realized. Reduction or elimination of residual shrinkage stress of the layer A by biaxial orientation as well as amorphous or non-oriented layer B can be preferably afforded by heat setting the film at a temperature in the range of from a temperature 15 degrees lower than the melting point of the polyester constituting layer A to a temperature 5 degrees lower than the melting point of the polyester constituting layer B, more preferably from a temperature 20 degrees lower than the melting point of the polyester constituting layer A to a temperature 2 degrees lower than the melting point of the polyester constituting layer B.

The polyester film of the present invention preferably contains crosslinked polymer particles and/or inorganic fine particles. By adding the crosslinked polymer particles and/or inorganic fine particles, the can forming processability can be improved and resistance to flaw (scratch resistance) can be imparted. These particles may be used alone or in combination of two or more kinds.

The above-mentioned crosslinked polymer particles are subject to no particular limitation as long as they have heat resistance to stand the temperature during melt forming of the polyester. Examples of the materials forming the crosslinked polymer particles include a copolymer of a monomer such as acrylic monomer (e.g., acrylic acid, methacrylic acid, acrylate, methacrylate and the like), styrene monomer (e.g., styrene, alkyl substituted styrene and like) and the like, and a crosslinking monomer (e.g., divinyl benzene, divinyl sulfone, ethylene glycol dimethacrylate, trimethylolpropane trimethacrylate, pentaerythritol tetramethacrylate and the like); melamine resin; benzoguanamine resin; phenol resin; silicone resin and the like. The crosslinked polymer particles can be produced from these materials by emulsion polymerization, suspension polymerization and the like known per se. The particle size and particle size distribution of the aforementioned crosslinked polymer particles may be adjusted by pulverization, classification and the like.

The above-mentioned inorganic fine particles are subject to no particular limitation as long as they are insoluble in polyester and they are inactive. Examples thereof include metal oxide (e.g., silica, alumina, zirconia, titanium oxide and the like), compound oxide (e.g., kaolin, zeolite, sericite, sepiolite and the like), sulfate (e.g., calcium sulfate, barium sulfate and the like), phosphate (e.g., calcium phosphate, zirconium phosphate and the like), carbonate (e.g., calcium carbonate and the like) and the like. These inorganic fine particles may be naturally occurring or synthesized. The form of the particles is not particularly limited, either.

The above-mentioned crosslinked polymer particles and/or inorganic fine particles have a particle size of preferably 0.5–5.0 μm, more preferably 0.8–4.0 μm. When the particle size is less than 0.5 μm, a sufficient effect of improving the slidability between the film and metal at a high temperature cannot be achieved, allowing easy occurrence of scratches on the film. When it exceeds 5.0 μm, the above-mentioned effect tends to become saturated, the particles tend to fall off, and the film tends to get broken during film forming.

The polyester film contains the above-mentioned crosslinked polymer particles and/or inorganic fine particles in a proportion of 0.3–5.0 wt %, more preferably 0.5–3.0 wt %, of the total amount of the polyester film. When it is less than 0.3 wt %, the effect of improving the slidability between the film and metal at a high temperature becomes smaller, allowing easy occurrence of scratches on the film. When it exceeds 5.0 wt %, the above-mentioned effect tends to become saturated and the film tends to show lower film forming property.

The above-mentioned crosslinked polymer particles and/or inorganic fine particles may be added to the polyester film during the production step of the polyester resin. Alternatively, the above-mentioned components may be added to the polyester resin and the resin may be melt kneaded. It is also possible to produce a polyester resin containing the above-mentioned components at a high concentration, and using this as a master batch, to melt knead a polyester resin without the above-mentioned components or containing the above-mentioned components in a small amount, with the master batch.

Where necessary, the polyester film of the present invention may contain an antioxidant, a heat stabilizer, an ultraviolet absorber, a plasticizer, a pigment, an antistatic agent, a lubricant, a crystal nucleating agent and the like.

The film-laminated metal plate of the present invention can be obtained by laminating the above-mentioned polyester film on at least one side of a metal plate, and is superior in can forming processability.

The metal plate to be used for the above-mentioned film-laminated metal plate is not particularly limited, and is exemplified by tin plate, tin free steel, aluminum and the like. While the thickness of the plate is not particularly limited, it is preferably 100–500 μm, more preferably 150–400 μm, from the economical aspects represented by costs of materials and the speed of can forming process, as well as for the maintenance of sufficient strength of the materials.

Known methods are applicable when laminating the polyester film on at least one side of the metal plate, and the method is not particularly limited. A preferable method is thermal lamination, and a particularly preferable method includes electrically heating the metal plate for thermal lamination. The polyester film may be laminated on both sides of the metal plate. In such a case, the film may be simultaneously laminated on the both sides or sequentially laminated.

When a polyester film having the above-mentioned two-layer A/B structure is laminated on at least one side of the metal plate, the layer B is laminated on the metal plate side, as mentioned above. In order to provide superior barrier property and superior corrosion resistance of the layer B and to improve adhesion to the laminate, the layer B may be previously coated with a known adhesive containing a thermosetting resin as a main component, before laminating the film.

The metal containers of the present invention can be obtained by forming the aforementioned film-laminated metal plate. The shape of the metal containers is not particularly limited. Examples thereof include a can, a bottle, a barrel and the like. The metal containers can be formed by any method. For example, known methods such as draw forming, iron forming, draw-iron forming and the like can be used.

The present invention is explained in detail in the following by referring to Example and Comparative Example. The present invention is not limited by these examples.

The measurement methods of the properties of the film used in Example and Comparative Example are shown in the following.

(1) Dimensional Changes of Polyester Film After Heat Treatment of Film-Laminated Metal Plate A degreased metal plate (thickness: 190 μm, tin free steel, L type bright finish, surface roughness: 0.3–0.5 μm, manufactured by NIPPON STEEL CORPORATION) was preheated to 200° C., and the metal plate was placed on one side of a polyester film sample (thickness: 12 μm). The obtained product was passed in between rubber rolls pressurized at 500 N/cm, at a speed of 10 m/minute, and quickly cooled with water to give a film-laminated metal plate [thickness 202 μm (polyester film/metal plate=12 μm/190 μm)]. The obtained film-laminated metal plate was cut into a 60 mm×60 mm square to give a sample, wherein the sides are in parallel relation with the direction of longitudinal orientation of the film or the film machine direction and the areas of the film sample and the metal plate were congruent. The obtained film-laminated metal plate sample was hung in the center of a hot-air oven adjusted to a wind velocity of 1–10 m/second, temperature 210%, and heat treated for 2 minutes. The film-laminated metal plate sample was taken out from the oven, and immediately immersed in water at not more than 25° C. for one second or longer to rapidly cool the sample. The length of the film in the sample in the direction of transverse orientation or in the direction perpendicular to the machine direction was read and taken as the size after heat treatment (I: unit mm). The dimensional change was calculated using the obtained I according to the following equation:

$$\text{Dimensional change}(\%) = (|61-I|/60) \times 100$$

(2) Melting Point

A sample was melted by heating at 300° C. for 5 minutes and rapidly cooled with liquid nitrogen. Using differential scanning calorimeter, the temperature peak of absorption caused by melting of crystals was measured while heating 10 mg thereof at a temperature elevating rate of 10° C./min.

(3) Intrinsic Viscosity

A sample was dissolved in a mixed solvent of phenol/tetrachloroethane (6/4 weight ratio) at a concentration of 0.4 g/dl, and intrinsic viscosity was measured using an Ubbelohde's viscometer at 30° C.

(4) Coefficient of Kinetic Friction

A film-laminated metal plate obtained in the same manner as in the above-mentioned (1) was cut into a 150 mm×100 mm rectangle to give a sample, wherein the long sides are in parallel relation with the direction of longitudinal orientation of the film or the film machine direction and the areas of the film sample and the metal plate were congruent. Then, the sample was set on a 1.5 kg metal block having a contact area of 50 mm×70 mm, such that the film side of the sample faces up and the direction of longitudinal orientation of the film or the film machine direction was in parallel relation to the running direction. The coefficient of kinetic friction was measured by running the sample at a speed of 250 mm/min on a tin free steel plate at 80° C.

(5) Quantitative Determination of Ethylene Terephthalate Cyclic Trimer

The sample was dissolved in hexafluoroisopropyl alcohol/chloroform=⅔ (V/V). The polyester was precipitated with methanol and the precipitate was filtered off. The filtrate was evaporated to dryness, and the residue was dissolved in N,N-dimethylformamide. The obtained solution was developed by liquid chromatography to quantitatively determine ethylene terephthalate cyclic trimer in the polyester.

(6) Evaluation of Oligomer Precipitation

The film-laminated metal plate obtained in the above-mentioned (1) was cut into a 100 mm×100 mm square to give a sample, wherein the sides are in parallel relation with the direction of longitudinal orientation of the film or the film machine direction and the areas of the film sample and the metal plate were congruent. This sample was subjected to a retorting treatment at 120° C. for 30 minutes using 500 cc of distilled water. The film-laminated metal plate after the treatment was air dried, the state of the film surface was observed with a magnifying glass and evaluated for the presence or otherwise of precipitation of a oligomer according to the following criteria. Observed: oligomer crystals were found on film surface Unobserved: oligomer crystals were not found on film surface

EXAMPLE (Production of Polyester Film)

A mixture (melting point 250° C., intrinsic viscosity 0.70) of polyethylene terephthalate (95 parts by weight) containing coagulation type silica (0.3 wt %, average particle size 1.5 μm) and spherical polymethyl methacrylate particles (1.0 wt %, average particle size 3.0 μm) crosslinked with trimethylolpropane trimethacrylate, which had a decreased ethylene terephthalate cyclic trimer content of 0.33 wt % by extraction, an intrinsic viscosity of 0.70 and a melting point of 250° C., and polybutylene terephthalate (5 parts by weight), which had an intrinsic viscosity of 1.10 and a melting point of 224° C. was used as a polyester for layer A. A copolymerized polyester (m.p. 215° C., intrinsic viscosity 0.65) of terephthalic acid/isophthalic acid (molar ratio 90/10) and ethylene glycol, which contained spherical silica (average particle size 1 μm) 0.1 wt %, was used as a polyester for layer B. The polyesters for layer A and layer B were melted in separate extruders. The obtained melts were mixed in a die and extruded onto a cooling drum to give an amorphous sheet. The amorphous sheet was stretched 3.5 times each in the longitudinal direction and the transverse direction at 90%, and heat-set at 220° C. to give a polyester film comprising layer A having a thickness of 9 μm and layer B having a thickness of 3 μm (total thickness 12 μm). The layer B in the polyester film was easily eroded by dichloromethane and was substantially unoriented.

(Production of Film-Laminated Metal Plate)

A degreased metal plate (thickness 190 am, tin free steel, L type bright finish, surface roughness 0.3–0.5 μm, manufactured by NIPPON STEEL CORPORATION) was preheated to 200° C. The metal plate was placed on the surface of the layer B of the above-mentioned polyester film. The obtained product was passed in between rubber rolls pressurized at 500 N/cm at a speed of 10 m/min. Then, the laminate was rapidly cooled with water to give a film-laminated metal plate [thickness 202 μm (polyester film (layer A/layer B)/metal plate=12 μm (9 μm/3 μm)/190 μm)]. The obtained film-laminated metal plate was measured for the dimensional change of the polyester film due to the heat treatment, according to the above-mentioned (1). As a result, the change was 0.8%. In addition, a coefficient of kinetic friction of the film surface (surface of layer A) at 80° C. and the ethylene terephthalate cyclic trimer content of the film were measured according to the above-mentioned (4) and (5), respectively. As a result, the coefficient was 0.38 and the content was 0.40 wt %. In addition, the precipitation of an oligomer was observed according to the above-mentioned (6), but no oligomer precipitated on the film surface.

(Production of Metal Container)

The aforementioned film-laminated metal plate was formed into a three-piece can. The metal plate enabled can forming process at a high speed. Furthermore, there was not found any problem such as looseness of the film, exposure of surface of the metal plate and the like after the heat treatment during the process. The can obtained in this way was filled with food, retorted at 125° C. for 30 minutes and subjected to a storage test at 40&c for 6 months. As a result, the can showed good corrosion resistance and superior food protection.

COMPARATIVE EXAMPLE

In the same manner as in the above-mentioned Example except that the above-mentioned polyethylene terephthalate (100 parts by weight) having ethylene terephthalate cyclic trimer content of 0.33 wt % was used as the polyester for layer A, polybutylene terephthalate was not used, and the heat setting was conducted at 160° C. for film forming, a polyester film and a film-laminated metal plate were produced.

The dimensional change after heat treatment of the film-laminated metal plate, coefficient of kinetic friction of the film-laminated metal plate and ethylene terephthalate cyclic trimer content of the polyester film of the film-laminated metal plate were 3.0%, 0.39 and 0.39 wt %, respectively.

When a film-laminated metal plate was produced using the polyester film, the film showed frequent occurrence of wrinkles, and the yield was low. When a metal container was produced using only a good portion of the film free of wrinkles, the covering of the joint part became impractically impaired due to the shrinkage of the film upon heat treatment during can forming process, thus making the product value very low.

The polyester film of the present invention has superior heat resistance and is capable of stably covering the surface of a metal plate even after a heat treatment during the can forming process and the like. In addition, the film is superior in barrier property, corrosion resistance, prevention of spoiled flavor and the like. Therefore, the film obliterates exposure of the surface of a metal plate and the like, provides excellent finish of cans and affords metal containers superior in corrosion resistance and protection of the contained food.

This application is based on application no. 316132/1999 filed in Japan, the contents of which are incorporated hereinto by reference.

What is claimed is:

1. A polyester film comprising:

a surface layer layer A and an adhesive layer B in a two layer structure, wherein, the layer A comprises a polyester mixture of a polyester containing a terephthalic acid-ethylene glycol component and a polyester containing a terephthalic acid-butanediol component, wherein the polyester mixture has a melting point of 240° C.–260° C.; and the layer B comprises a polyester having a melting point of 200° C.–235° C., wherein the polyester film has a coefficient of kinetic friction at the surface of the layer A of not more than 0.45 at 80° C. when the film is thermally adhered on the layer B side of the film to a metal plate comprising a tin free steel to provide a laminate, an ethylene terephthalic cyclic trimer content of not more than 0.70 wt %, and a change in length or width of not more than 2.0% when the film is thermally adhered on the layer B side of the film to the metal plate comprising a tin free steel to provide a laminate and then heat-treated at 210° C. for 2 minutes.

2. The polyester of claim 1, which is a biaxially oriented film.

3. The film of claim 1, which further comprises crosslinked polymer particles, inorganic particles or crosslinked polymer particles and inorganic particles.

4. A film laminated metal plate comprising the polyester film of claim 1 laminated on at least one side of the metal plate.

5. A metal container obtained by forming the film-laminated metal plate of claim 4.

6. The film laminated plate of claim 4, wherein the metal plate is made of a tin free steel.

7. The polyester film of claim 1, wherein the polyester mixture of the layer A comprises one containing a terephthalic acid-ethylene glycol component and one containing a terephthalic acid-butanediol component in a weight ratio of 98/2–50/50.

8. The polyester film of claim 1, wherein the polyester of the layer B comprises a copolymerized polyester of a terephthalic acid and an isophthalic acid as acid component.

9. The polyester film of claim 1, wherein the layer A has a thickness of 4–40 $\mu$m and the layer B has a thickness of 1–10 $\mu$m.

* * * * *

UNITED STATES PATENT AND TRADEMARK OFFICE
CERTIFICATE OF CORRECTION

PATENT NO. : 6,878,442 B1
DATED : April 12, 2005
INVENTOR(S) : Hideki Igushi et al.

It is certified that error appears in the above-identified patent and that said Letters Patent is hereby corrected as shown below:

<u>Column 4,</u>
Line 43, delete "210-235%" and replace with -- 210-235°C --.

<u>Column 9,</u>
Line 30, delete "90%" and replace with -- 90°C --.
Line 65, delete "40&c" and replace with -- 40°C --.

Signed and Sealed this

Eleventh Day of October, 2005

JON W. DUDAS
*Director of the United States Patent and Trademark Office*